(12) United States Patent
Frammartino

(10) Patent No.: US 10,040,217 B2
(45) Date of Patent: Aug. 7, 2018

(54) MASONRY TOOL CLEANING AND STORAGE DEVICE

(71) Applicant: Demetrio Frammartino, Cuyahoga Falls, OH (US)

(72) Inventor: Demetrio Frammartino, Cuyahoga Falls, OH (US)

( * ) Notice: Subject to any disclaimer, the term of this patent is extended or adjusted under 35 U.S.C. 154(b) by 0 days.

(21) Appl. No.: 15/094,153

(22) Filed: Apr. 8, 2016

(65) Prior Publication Data

US 2017/0291325 A1 Oct. 12, 2017

(51) Int. Cl.
  *B60R 7/00* (2006.01)
  *B28D 7/04* (2006.01)
  *B62B 5/00* (2006.01)
  *B28D 7/02* (2006.01)

(52) U.S. Cl.
  CPC ............. *B28D 7/04* (2013.01); *B28D 7/02* (2013.01); *B62B 5/00* (2013.01); *B62B 2202/50* (2013.01)

(58) Field of Classification Search
  CPC ............. B28D 7/04; B28D 7/02; B62B 5/00
  See application file for complete search history.

(56) References Cited

U.S. PATENT DOCUMENTS

| | | | |
|---|---|---|---|
| 4,203,329 A | 10/1980 | Johnson | |
| 5,415,421 A | 5/1995 | Godwin | |
| 5,788,849 A * | 8/1998 | Hutter, Jr. | B01D 15/00 210/163 |
| 5,887,878 A | 3/1999 | Tisbo et al. | |
| 5,897,036 A * | 4/1999 | DeCoster | B65D 43/169 222/480 |
| 6,105,980 A | 8/2000 | Cino et al. | |
| 6,193,265 B1 * | 2/2001 | Yemini | B60B 37/10 280/47.31 |
| 6,923,485 B1 | 8/2005 | Bauswell | |
| 6,964,421 B2 * | 11/2005 | Friel | B62B 1/20 280/47.31 |
| 7,562,889 B2 | 7/2009 | Hand et al. | |
| 7,988,181 B2 | 8/2011 | Hand et al. | |
| 8,887,929 B2 * | 11/2014 | Erlenbach | B25H 5/00 211/193 |
| 2005/0212238 A1 * | 9/2005 | Conley | B25H 1/04 280/47.32 |
| 2005/0280227 A1 * | 12/2005 | Murphy | B62B 1/20 280/47.31 |

(Continued)

FOREIGN PATENT DOCUMENTS

| | | |
|---|---|---|
| FR | 2426783 | 5/1978 |
| WO | 200133012 | 5/2001 |

*Primary Examiner* — Derek Battisti
(74) *Attorney, Agent, or Firm* — Dominc A. Frisina

(57) ABSTRACT

A masonry tool cleaning and storage device may include one or more bins capable of holding water and adapted to hang from the sides of a conventional wheel barrow. The bins may or may not have lids, which may or may not be attached to the bins. The device may optionally include a combined drying table and water return surface adapted to route water, e.g. dripping from wet tools, back to the water bins. The drying table may include a grated surface that is more or less horizontal while assembled in a working configuration. The grated surface may be above a downwardly sloped surface adapted to return water that has fallen through the grated surface back to the bins. When work is complete, the bins may be emptied of water, cleaned, and used for tool storage.

17 Claims, 7 Drawing Sheets

(56) References Cited

U.S. PATENT DOCUMENTS

| | | | |
|---|---|---|---|
| 2007/0039986 A1* | 2/2007 | Tomasi | B25H 3/04 224/401 |
| 2010/0116960 A1* | 5/2010 | Lusk | B62B 1/266 248/314 |
| 2010/0127028 A1* | 5/2010 | Lusk | B62B 1/20 224/401 |
| 2011/0260420 A1* | 10/2011 | Volin | B62B 1/204 280/47.31 |
| 2015/0001267 A1* | 1/2015 | Thorsen | B62B 1/204 224/401 |

* cited by examiner

MASONRY TOOL CLEANING AND STORAGE DEVICE

I. BACKGROUND OF THE INVENTION

A. Field of Invention

The invention generally relates, but is not necessarily limited, to the field of masonry trades, tools, and tool storage and maintenance.

B. Description of the Related Art

The masonry trade has had a longstanding problem arising from the need to keep masonry tools clean and free from hardened cement. This is particularly necessary with regard to brushes and brooms for finishing cement, i.e. adding desired textures to cement. These tools are especially prone to retaining cement in their bristles, and if the material is not removed in a timely fashion it will harden and result in a more or less permanent defect in the tool. A tool having such a defect causes streaking and non-uniform patterns in cement which is regarded as a fault. Generally, tools must be cleaned regularly during use which requires a source of water; however, running water sources, e.g. faucets or hoses, are often not immediately accessible at a worksite, so valuable time can be lost in making trips between a water source and a location where a mason is working.

One solution is for the mason to carry a bucket of water, but this does not address the need to keep tools clean and dry after being washed; it would not be acceptable to simply lay a clean broom in the dirt, for instance. Furthermore, water is often lost in the process of cleaning tools and the amount of water that can be carried in a bucket is limited, which necessitates additional trips back and forth to a water source. Again this wastes time, labor, and money on ancillary tasks, and since the working time of cement is limited the mason must take into account the time spent on these trips. This may require adding a person to the job, or mixing a larger number of smaller batches. Either option results in waste. What is needed is a device that allows a mason to conveniently carry a larger amount of water, provide him with a clean surface on which to place his tools, and provide means for conserving water to limit water refill trips.

Some embodiments of the present invention may provide one or more benefits or advantages over the prior art.

II. SUMMARY OF THE INVENTION

Some embodiments may relate to a device, comprising a bin having a generally rectangular cross section perpendicular to a longitudinal axis. The bin may be adapted to retain liquids with two approximately equal and opposing short sides, two approximately equal and opposing long sides, and a bottom. The embodiment may include a mounting bracket extending from a long side of the bin and running generally longitudinally along the long side the bin. The mounting bracket may be adapted to support a vertical load and to anchor the bin in an upright position against a first horizontally applied load. The bin may also include a lateral spacer extending from the same long side of the bin as the mounting bracket and vertically offset from the mounting bracket. The lateral spacer may be adapted to cooperate with the mounting bracket to maintain the bin in an upright position against a second horizontally applied load oriented in a direction opposing that of the first horizontally applied load.

According to some embodiments the mounting bracket runs along the long side of the bin at an acute angle relative to a first top edge of the bin.

According to some embodiments the acute angle is less than 45 degrees.

According to some embodiments the mounting bracket includes a vertical-load bearing member extending from one of the two approximately equal and opposing long sides of the bin, and a horizontal-load bearing member extending from the vertical-load bearing member at an angle between 85 and 95 degrees.

Embodiments may optionally further comprise a lid adapted to contact at least a first top edge and a second top edge of the bin.

Embodiments may optionally further comprise a fulcrum member extending from the first top edge of the bin, wherein an edge of the fulcrum member is adapted to engage an acute inside angle of a rim of the lid in a pivotal relation, the rim comprising a lever.

According to some embodiments the fulcrum member extends from the first top edge of the bin at an angle parallel with a plane the first top edge of the bin and the second top edge of the bin.

According to some embodiments the lever and fulcrum cooperate to form a separable hinge.

Embodiments may optionally further comprise a water return surface having a first planar panel and a second planar panel, the panels meeting to form a vertex extending longitudinally, wherein an interior angle and an exterior angle of the vertex are both obtuse.

According to some embodiments the water return surface further comprises a bin-engaging tab extending from an edge of the water return surface and adapted to contact an inner surface the bin.

According to some embodiments the bin-engaging tab is adapted to simultaneously contact an inner surface of a long side of the bin and an inner surface of two short sides of the bin.

Embodiments may optionally further comprise a drying table mounted to and disposed above the water return surface, wherein the drying table comprises a grated top surface.

According to some embodiments in the grated top surface is bounded by a plurality of sidewalls, the plurality of sidewalls being attached to the water return surface.

According to some embodiments the grated top surface is vertically supported by a surface of a ledge extending inward from one or more of the plurality of sidewalls.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

As used herein the terms "embodiment", "embodiments", "some embodiments", "other embodiments" and so on are not exclusive of one another. Except where there is an explicit statement to the contrary, all descriptions of the features and elements of the various embodiments disclosed herein may be combined in all operable combinations thereof.

Language used herein to describe process steps may include words such as "then" which suggest an order of operations; however, one skilled in the art will appreciate that the use of such terms is often a matter of convenience and does not necessarily limit the process being described to a particular order of steps.

Conjunctions and combinations of conjunctions (e.g. "and/or") are used herein when reciting elements and characteristics of embodiments; however, unless specifically stated to the contrary or required by context, "and", "or" and "and/or" are interchangeable and do not necessarily require every element of a list or only one element of a list to the exclusion of others.

Figure 1:
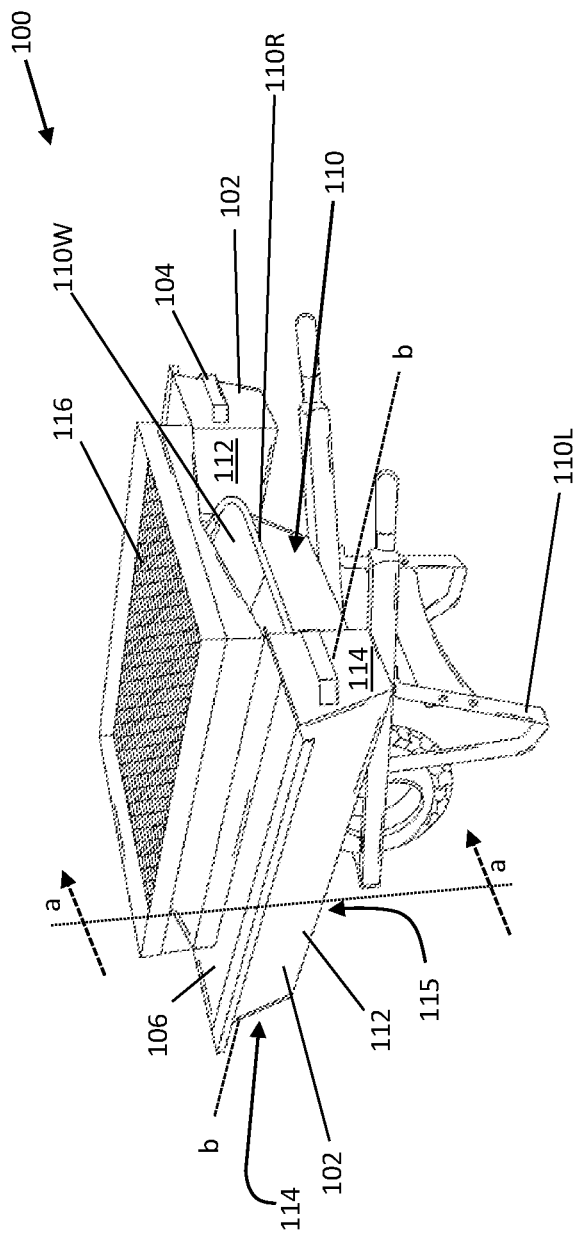
FIG. 1 is an elevation perspective view of an embodiment fully assembled and installed on a common wheelbarrow.

Referring now to the drawings wherein the showings are for purposes of illustrating embodiments of the invention only and not for purposes of limiting the same, FIG. 1 is an overall view of an embodiment 100 fully assembled and installed on a conventional wheelbarrow. The embodiment 100 includes a bin 102 installed on either side of the wheelbarrow 110. The bins 102 of this embodiment 100 are have a generally rectangular cross section taken along line a-a and perpendicular to longitudinal axis b-b. According to the invention the term generally rectangular includes any four sided figure including trapezoids and irregular trapezoids as shown in FIG. 1. The bins 102 may include a pair of opposing long sides 112, and a pair of opposing short sides 114, thus forming an elongated bin having a bottom 115. While an elongated bin structure is not a requirement of the present invention, it may be advantageous for cleaning wider brush sizes. The bins 102 also include handles 104 which may be advantageously disposed at both ends of the bins 102 to facilitate manually lifting the bins 102. Embodiments may include lids 106 which may be adapted to engage the top of the bins 102 and serve as a closure thereof. Embodiments may also optionally include a drying table 116.

Figure 2:
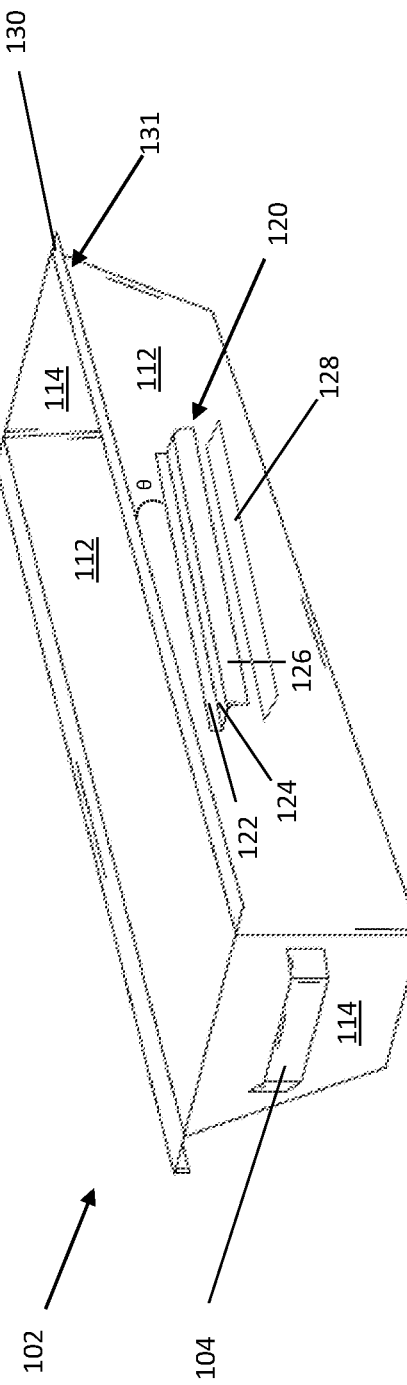
FIG. 2 is a first perspective view of a bin, according to one embodiment, without a lid installed.
Figure 3:
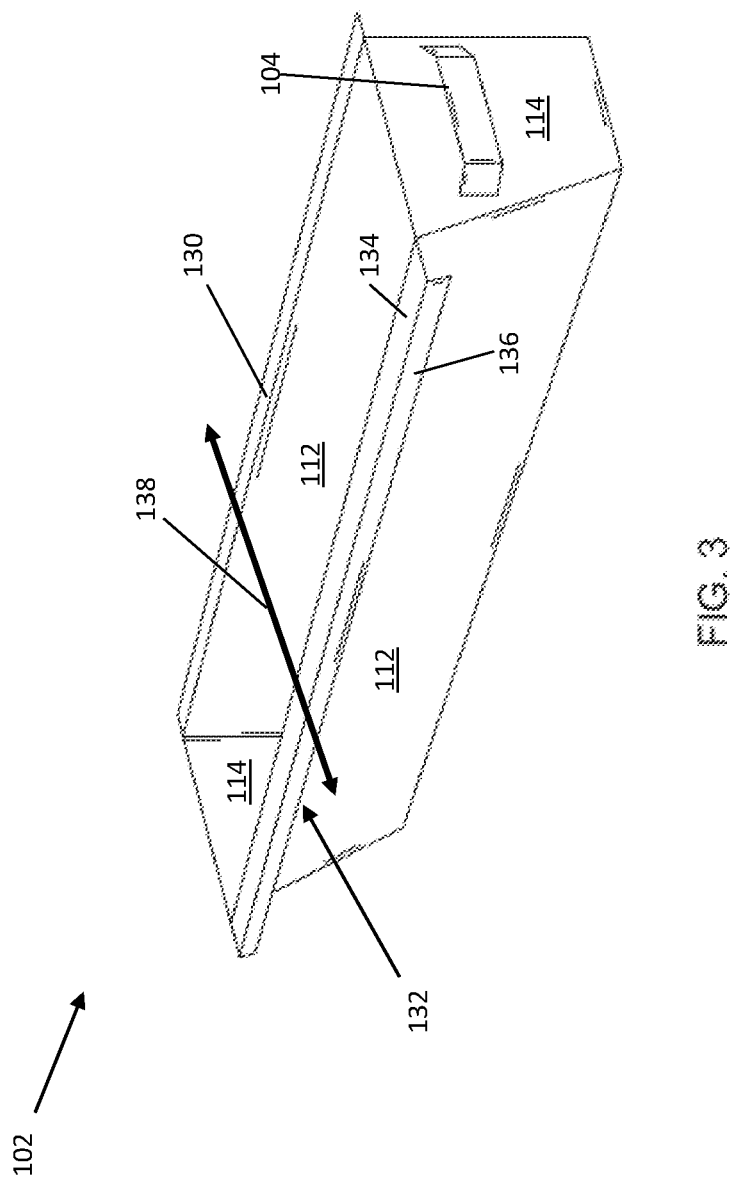
FIG. 3 is a second perspective view of the bin of FIG. 2 showing the side opposing that which is shown FIG. 2.

FIG. 2 and FIG. 3 illustrate a bin 102 from differing angles showing the structures disposed on either of the two long sides 112. FIG. 2 shows a mounting bracket 120 joined to a long side 112 of the bin 102. One skilled in the art will readily appreciate that various means for joining the mounting bracket 120 to the bin 102 are well known and are all within the scope of the invention. For instance, and without limitation, welding and the use of various fasteners would be well known design choices within the scope of the invention. The mounting bracket 120 of FIG. 2 is shown running generally longitudinally along the long side 112, where the term "generally longitudinally" includes setting the mounting bracket at an angle θ relative to the top edge of the bin 102.

With continuing reference to FIG. 2, while a non-zero angle θ not required, the mounting bracket 120 may be joined at such an angle θ as to compensate for the built-in rearward tilt of a typical wheelbarrow. It is known to build wheelbarrows so that the upper rim 110R (See FIG. 1) of the wheelbarrow tub slopes at a downward angle from front to rear when the wheelbarrow is resting on its rear legs 110L (See FIG. 1) on level ground. This rearward tilt tends to make up for the forward tilt generated by a user of average height picking up the handles of the wheelbarrow. Thus, the upper rim of the wheelbarrow tub is more or less level when it is being moved about by a user. However, it may be advantageous for some embodiments of the invention to be level when the wheelbarrow is resting on its rear legs. Accordingly, the mounting bracket 120 may optionally be joined at an angle θ, relative to the top edge of the bin 102, sufficient to level the embodiment when the wheel barrow is resting on its rear legs. While there is no particular value of angle θ that will work in every application, a typical value of angle θ is less than 45°.

Continuing with FIG. 2, the mounting bracket 120 is adapted to support a vertical load and to anchor the bin in an upright position against a first horizontally applied load. More specifically, the mounting bracket 120 includes a joining member 122 that lays flat against the side wall 112 and joins the bracket 120 thereto, e.g. via a weld joint. The bracket 120 further includes a vertical load bearing member 124 extending away from the sidewall 112 and first section 122. The vertical load bearing member serves to vertically support the bin 102 against the upper rim 110R of the wheelbarrow tub. A third section extending downward and away from the vertical load bearing member 124 serves as a horizontal load bearing member 126 horizontally supporting the bin 102 against the inner wall 110W of the wheelbarrow. The vertical 124 and horizontal 126 load bearing members cooperate to form a hook-like structure that is suitable for engaging a wall of a wheelbarrow, supporting the bin 102 thereupon, and frictionally fixing the bin in place relative to the wheelbarrow.

The bin 102 shown in FIG. 2 also includes a lateral spacer 128 extending from the same long side 112 of the bin as the mounting bracket 120 and vertically offset from the mounting bracket 120. The lateral spacer 128 is adapted to cooperate with the mounting bracket 120 to maintain the bin 102 in an upright position. Since the center of mass of the bin 102 is laterally offset from the mounting bracket 120, in the absence of a spacer 128, the torque generated by the center of mass of the bin 102 would tend to pivot the bin 102 on its mounting bracket 120 about the upper rim 110R of the wheelbarrow toward the wheelbarrow tub. Thus, the lateral spacer 128 keeps the bin 102 upright. Since the bin is static, the horizontal forces applied to the horizontal load bearing member 126 and the lateral spacer 128 are equal in magnitude and opposite in direction. Along with the vertical force borne by the vertical load bearing member 124, the horizontal forces generate friction between the embodiment and the wheelbarrow that tends to hold the embodiment in place.

With still further reference to FIG. 2, the upper rim of the bin 102 includes a fulcrum member 130 of a separable hinge. The fulcrum member 130 is adapted to cooperate with a lever member of a lid to form the separable hinge as will be discussed in more detail herein. Turning to FIG. 3, the long side 112 opposing that of FIG. 2 is shown in greater detail. A lid seat 132 shown having a horizontal portion 134 and a vertical portion 136. The lid seat 132 functions to brace a lid against lateral motions in the direction shown by line 138.

Figure 4:
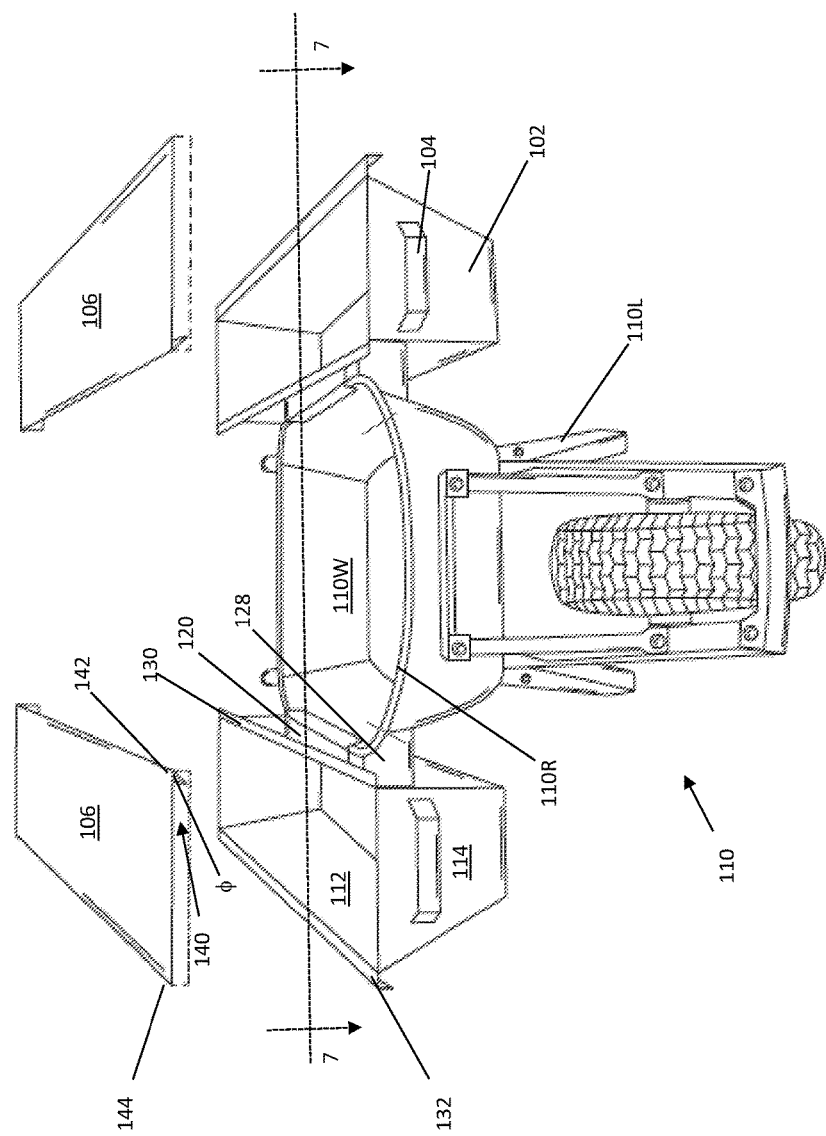
FIG. 4 is a view of the bin of FIGS. 2 and 3 shown in relation to a lid and particularly showing structures enabling the bin and lid to engage each other.

FIG. 4 is a partially exploded view of an embodiment wherein a pair of bins 102 are installed on either side of a wheelbarrow 110. The mounting brackets 120 and lateral spacers 128 are shown cooperating to hold the bins 102 in an upright position. Lids 106 are also shown in FIG. 4 in exploded view. The lids 106 include a lever 140 adapted to mate with the fulcrum 130 in a pivotal relation to form a separable hinge. The fulcrum 130 fits into the inside angle φ of the lever 140. The pivotal relation is formed where the edge 131 of the fulcrum 130 abuts the apex 142 of the lever 140. As shown in FIG. 4, the lever 140 is formed by bending the sheet metal forming the lid 106 to make a tab running the length of the lid; however, the skilled artisan will readily appreciate that the invention is not limited to sheet metal fabrication. The lever 140 has an inside angle φ of about 45° +/−20°. The lever 140 may be crimped or otherwise closed at both ends of the lid to prevent the lid from sliding fore or aft. The opposing edge of the lid 144 may be bent at an angle suitable to mate with the lid seat 132. Accordingly, the lever 140, crimping, and opposing edge 144 cooperate with the lid seat 132 and fulcrum 130 of the bin 102 to fix the lid in place when the lid is closed.

Figure 5:
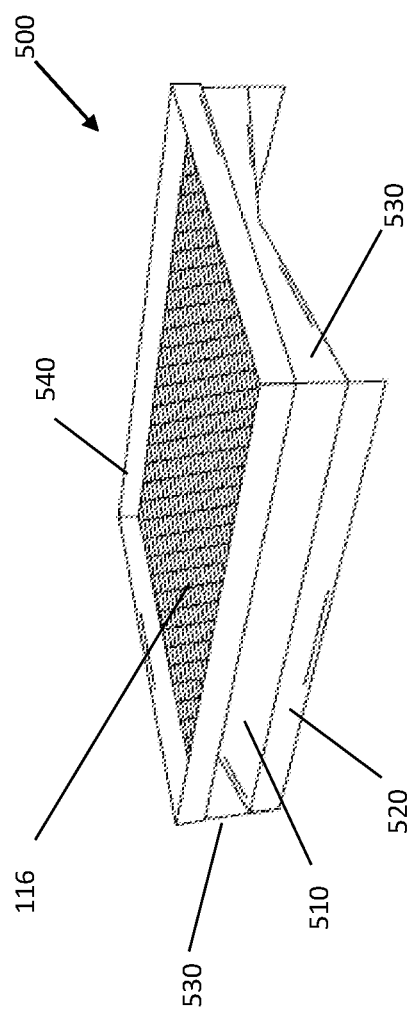
FIG. 5 is a top perspective view of a drying table and water-return according to an embodiment of the invention.
Figure 6:
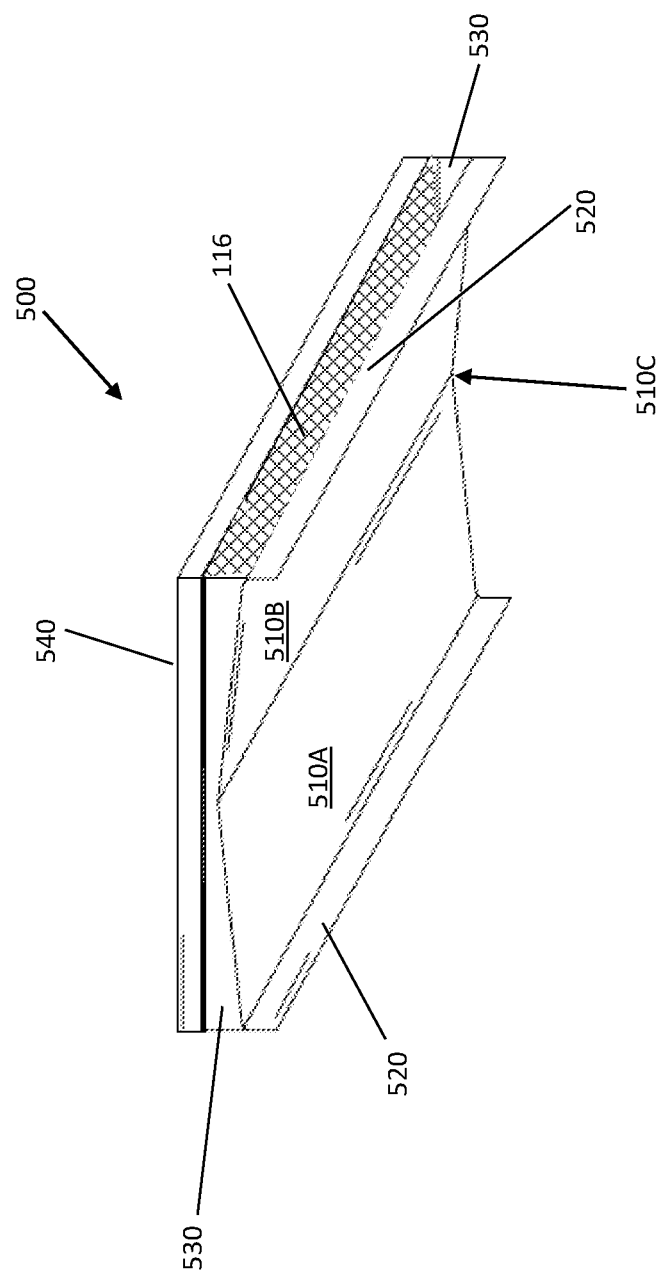
FIG. 6 is a bottom perspective view of the drying table of FIG. 5.

FIG. 5 illustrates an optional work surface 500 which may comprise an element in some embodiments of the invention. The work surface 500 includes a drying table 116. The drying table 116 may advantageously be constructed in a grated form so as to allow water from wet tools to fall onto a water return surface 510. The water return surface 510 may have a first planar panel and a second planar panel meeting to form a vertex thereby providing a downward slope for directing the flow of draining water. The planar panels may, for instance and without limitation, be formed from a single sheet of metal bent to form an apex. The drying table 116 may be suspended above the water return surface 510 by supporting walls 530. Furthermore, the drying table may include a perimeter wall 540. The perimeter wall may help to retain tools or other objects on the drying table 116, and may serve other functions as will be apparent to those skilled in the art. The work surface 500 further includes a pair of bin-engaging tabs 520. The bin-engaging tabs 520 extend from an edge of the water return surface and are adapted to contact an inner surface of a bin 102. Thus, the walls of the bin 102 hold the work surface 500 in place. In some embodiments the bin-engaging tabs may run the entire length of the inside wall of a bin so that the work surface 500 has little or no longitudinal motion relative to the bin. FIG. 6 is an underside view of the work surface 500 of FIG. 5 wherein the two panels 510A and 510B of the water return surface 510 are visible, along with an apex 510C running longitudinally down the center of the water return surface.

Figure 7:
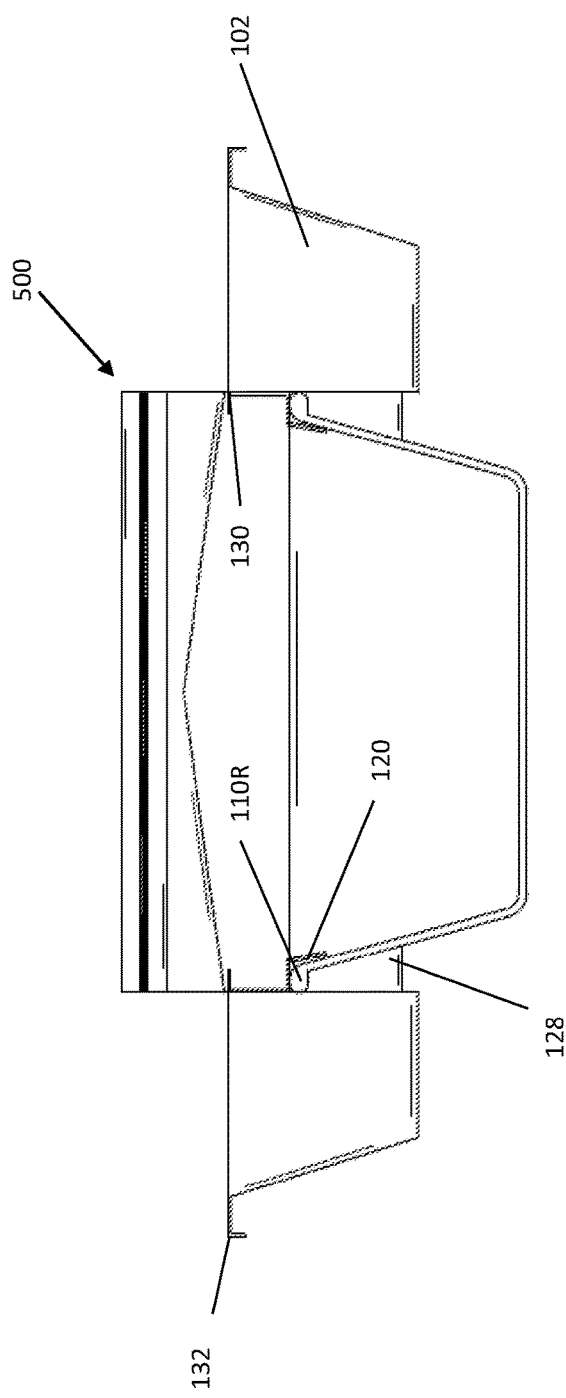
FIG. 7 is a cross sectional view of a fully assembled embodiment, with the cross section being taken along line 7-7 of FIG. 4, showing the spatial relationship of all of the pieces thereof

FIG. 7 provides a detailed view of certain structures of the invention and how they cooperate with each other. For instance, the mounting bracket 120 is shown engaging the upper rim 110R of the wheelbarrow, and the lateral spacer 128 is shown abutting the exterior wall of the wheelbarrow. Thus, the bins 102 are kept in an upright position. The lids 106 are not shown in this view. The work surface 500 is shown in place of the lids.

It will be apparent to those skilled in the art that the above methods and apparatuses may be changed or modified without departing from the general scope of the invention. The invention is intended to include all such modifications and alterations insofar as they come within the scope of the appended claims or the equivalents thereof.

I claim:

1. A device, comprising:
    a bin, having a generally rectangular cross section perpendicular to a longitudinal axis, and adapted to retain liquids with two approximately equal and opposing short sides, two approximately equal and opposing long sides, and a bottom;
    a mounting bracket extending from a long side of the bin and running generally longitudinally along the long side the bin, the mounting bracket being adapted to cooperate with a sidewall of a wheelbarrow to support a vertical load and to anchor the bin in an upright position against a first horizontally applied load;
    a lateral spacer extending from the same long side of the bin as the mounting bracket and vertically offset from the mounting bracket, the lateral spacer being adapted to cooperate with the mounting bracket and the sidewall of the wheelbarrow to maintain the bin in an upright position against a second horizontally applied load oriented in a direction opposing that of the first horizontally applied load; and
    a water return surface having a first planar panel and a second planar panel extending over the wheelbarrow, the panels meeting to form a vertex extending longitudinally, wherein an interior angle and an exterior angle of the vertex are both obtuse, wherein the water return surface further comprises a bin-engaging tab extending from an edge of the water return surface and adapted to contact an inner surface the bin.

2. The device of claim 1, wherein the mounting bracket runs along the long side of the bin at an acute angle relative to a first top edge of the bin.

3. The device of claim 2, wherein the acute angle is less than 45 degrees.

4. The device of claim 1, wherein the mounting bracket includes a vertical-load bearing member extending from one of the two approximately equal and opposing long sides of the bin, and a horizontal-load bearing member extending from the vertical-load bearing member at an angle between 85 and 95 degrees.

5. The device of claim 1, further comprising a lid adapted to contact at least a first top edge and a second top edge of the bin.

6. The device of claim 5, further comprising a fulcrum member extending from the first top edge of the bin, wherein an edge of the fulcrum member is adapted to engage an acute inside angle of a rim of the lid in a pivotal relation, the rim comprising a lever.

7. The device of claim 6, wherein the fulcrum member extends from the first top edge of the bin at an angle parallel with a plane the first top edge of the bin and the second top edge of the bin.

8. The device of claim 5, wherein the lever and fulcrum cooperate to form a separable hinge.

9. The device of claim 1, wherein the bin-engaging tab is adapted to simultaneously contact an inner surface of a long side of the bin and an inner surface of two short sides of the bin.

10. The device of claim 9, further comprising a drying table mounted to and disposed above the water return surface, wherein the drying table comprises a grated top surface.

11. The device of claim 10, wherein the grated top surface is bounded by a plurality of sidewalls, the plurality of sidewalls being attached to the water return surface.

12. The device of claim 11, wherein the grated top surface is vertically supported by a surface of a ledge extending inward from one or more of the plurality of sidewalls.

13. A device, comprising:
- a bin having a generally rectangular cross section and adapted to retain liquids with two approximately equal and opposing short sides, two approximately equal and opposing long sides, and a bottom;
- a mounting bracket having a vertical-load bearing member co-operable with a sidewall of a wheelbarrow and extending from one of the two approximately equal and opposing long sides of the bin, and a horizontal-load bearing member co-operable with the sidewall of the wheelbarrow and extending from the vertical-load bearing member at an interior angle between 85 and 95 degrees, the mounting bracket running longitudinally along the long side of the bin at an acute angle relative to a first top edge of the bin;
- a planar tab extending from the first top edge of the bin;
- a lateral spacer extending from the same long side of the bin as the mounting bracket and vertically offset from the mounting bracket, the lateral spacer being adapted to cooperate with the mounting bracket and with the sidewall of the wheelbarrow to maintain the bin in an upright position against a second horizontally applied load oriented in a direction opposing that of the first horizontally applied load;
- a lid adapted to contact at least a first top edge and a second top edge of the bin, wherein an edge of the planar tab is adapted to engage an inside angle of a rim of the lid in a pivotal relation; and
- a water return surface having a first planar panel and a second planar panel extending over the wheelbarrow, the panels meeting to form a vertex extending longitudinally, and having a bin-engaging tab extending from an edge of the water return surface and adapted to contact an inner surface the bin.

14. The device of claim 13, further comprising a drying table having:
- a grated top surface disposed above the water return surface;
- a plurality of sidewalls bounding the edges of the grated top surface, and the plurality of sidewalls being attached to the water return surface.

15. The device of claim 14, wherein the grated top surface is vertically supported by a surface of a ledge extending inward from one or more of the plurality of sidewalls.

16. A device, comprising:
- an pair of bins each having a generally rectangular cross section and adapted to retain liquids with two approximately equal and opposing short sides, two approximately equal and opposing long sides, and a bottom;
- a mounting bracket having a vertical-load bearing member co-operable with a sidewall of a wheelbarrow and extending from one of the two approximately equal and opposing long sides of each of the bins, and a horizontal-load bearing member co-operable with the sidewall of the wheelbarrow and extending from the vertical-load bearing member at an interior angle between 85 and 95 degrees, the mounting bracket running longitudinally along the long side of each of the bins at an acute angle relative to a first top edge of each of the bins;
- a planar tab extending from the first top edge of each of the bins;
- a lateral spacer extending from the same long side of each of the bins as the mounting bracket and vertically offset from the mounting bracket, the lateral spacer being adapted to cooperate with the mounting bracket and with the sidewall of the wheelbarrow to maintain the bin in an upright position against a second horizontally applied load oriented in a direction opposing that of the first horizontally applied load;
- a lid adapted to contact at least a first top edge and a second top edge of each of the bins, wherein an edge of the planar tab is adapted to engage an inside angle of a rim of the lid in a pivotal relation; and
- a first planar panel and a second planar panel, the panels meeting to form a vertex extending longitudinally over the wheelbarrow; and
- a bin-engaging tab extending from an edge of the water return surface and adapted to contact an inner surface a bin.

17. The device of claim 16, further comprising:
- a grated surface disposed above the first and second planar panels;
- a plurality of sidewalls bounding the edges of the grated surface and attached to the first and second planar panels; and
- a ledge extending inward from one or more of the plurality of sidewalls and vertically supporting the grated surface.

* * * * *